US011862917B2

(12) United States Patent
Tirca-Dragomirescu et al.

(10) Patent No.: US 11,862,917 B2
(45) Date of Patent: Jan. 2, 2024

(54) CRIMP CONNECTOR

(71) Applicant: Lear Corporation, Southfield, MI (US)

(72) Inventors: Georgiana Tirca-Dragomirescu, Munich (DE); Klaus Junker, Diessen am Ammersee (DE); Jose Luis Mendieta Garcia, Munich (DE)

(73) Assignee: LEAR CORPORATION, Southfield, MI (US)

( * ) Notice: Subject to any disclaimer, the term of this patent is extended or adjusted under 35 U.S.C. 154(b) by 0 days.

(21) Appl. No.: 17/835,588

(22) Filed: Jun. 8, 2022

(65) Prior Publication Data

US 2022/0399656 A1 Dec. 15, 2022

(30) Foreign Application Priority Data

Jun. 10, 2021 (DE) ......................... 202021103144.1

(51) Int. Cl.
*H01R 4/01* (2006.01)
*H01R 4/18* (2006.01)

(52) U.S. Cl.
CPC ............... *H01R 4/188* (2013.01); *H01R 4/01* (2013.01)

(58) Field of Classification Search
CPC . H01R 4/01; H01R 4/26; H01R 4/183; H01R 4/184; H01R 4/188; H01R 5/08; H01R 11/20; H01R 13/11; H01R 13/5808; H01R 43/058; H01R 43/048; B21F 1/00
USPC ................... 174/74 R, 78, 84 R, 88 R, 88 C; 439/95 R, 96, 97 C, 865, 867–869, 877; 140/105, 106
See application file for complete search history.

(56) References Cited

U.S. PATENT DOCUMENTS

| | | | | | |
|---|---|---|---|---|---|
| 3,950,064 | A * | 4/1976 | Kuo | H01R 4/184 | 439/421 |
| 4,033,535 | A * | 7/1977 | Moran | H02G 3/0658 | 439/449 |
| 4,558,915 | A * | 12/1985 | Greenwood | H01R 12/616 | 439/422 |
| 5,338,233 | A * | 8/1994 | Endo | H01R 4/185 | 439/865 |
| 7,650,914 | B2 * | 1/2010 | Bogursky | H01R 43/048 | 140/105 |

(Continued)

FOREIGN PATENT DOCUMENTS

EP 1 870 962 B1 4/2014

*Primary Examiner* — William H. Mayo, III
(74) *Attorney, Agent, or Firm* — BROOKS KUSHMAN P.C.

(57) ABSTRACT

A crimp connector for a wire includes first and second clamping plates connected via a bending portion so as to be pivotable with respect to one another for clamping the wire between them in a clamping state. Inner surfaces of the clamping plates are designed as clamping surfaces having a plurality of elongated depressions and elongated ribs that run perpendicularly to a pivot axis of the bending portion. The ribs of one clamping plate are each arranged and dimensioned in such a way that they are at least partially arranged in the depressions of the other clamping plate in the clamping state such that a wire clamped between the clamping plates in the clamping state is formed into a meandering shape. Distance between adjacent depressions in at least one of the first and second clamping plates varies along the clamping surface on a straight line parallel to the pillar axis.

20 Claims, 3 Drawing Sheets

(56) References Cited

U.S. PATENT DOCUMENTS

| | | | | |
|---|---|---|---|---|
| 2015/0072573 | A1* | 3/2015 | Kawamura | H01R 4/188 439/867 |
| 2020/0287300 | A1* | 9/2020 | Li | H01R 4/188 |
| 2020/0287322 | A1* | 9/2020 | Dörfler | H01R 13/5808 |
| 2023/0122329 | A1* | 4/2023 | Edwards | H01R 4/14 439/420 |

* cited by examiner

CRIMP CONNECTOR

CROSS-REFERENCE TO RELATED APPLICATIONS

This application claims foreign priority benefits under 35 U.S.C. § 119(a)-(d) to German utility model application number DE 20 2021 103 144.1, filed Jun. 10, 2021, which is incorporated by reference in its entirety.

TECHNICAL FIELD

The disclosure relates to a crimp connector for fastening wires, in particular fine filaments made of a shape memory alloy (SMA).

BACKGROUND

Crimp connectors are used to fasten tension-loaded wires to a device and are intended to ensure wire positioning that can be produced in a rapid manner. Crimp connectors are used, for example, conjunction with wires made of shape memory alloy (SMA). SMA wires are used, inter alia, in motor vehicles, in particular in conjunction with a valve actuating mechanism. Thus, solenoid valves are technically well suited to be used as controllable valves in massage systems and in lordosis support systems and cushion systems for vehicle seats. The shape memory alloy of the SMA wire changes its microscopic structure at a threshold temperature, with the result that an SMA wire shortens upon exceeding the threshold temperature. The shortening of the SMA wire provides a force which can act on a valve tappet and move it into a desired position. The actuation of the SMA valve occurs by electrical energy being selectively supplied to the SMA wire in order to heat it to the threshold temperature and to hold it at such a temperature for the desired activation cycle. The SMA wire can cool below the threshold temperature by terminating the electrical energy supply to the SMA wire. The crimp connectors for fastening the wire have high requirements placed on them. The fastening of the SMA wire should be able to be produced by means of a simple mechanism and at the same time the wire for the intended use has to be fastened to the crimp connector in a sufficiently firm manner.

EP 1 870 962 B1 descries crimp connector having two first and second clamping plates which are connected so as to be pivotable with respect to one another and which are connected to one another via a bending portion and which clamp the wire between them in a clamping state in which they pivoted against one another. The inner surfaces of the clamping plates are structured for longitudinally fixing the wire. The inner surfaces of the clamping plates that face one another in the clamping state are formed with a plurality of elongate depressions which are spaced apart from one another and which run transversely with respect to the axis of the wire, that is to say perpendicularly to the pivot axis of the bending portion. As a result, the depressions form groove-like recesses in the clamping surfaces and interposed ribs, wherein the ribs of the first clamping plate partially engage in the depressions of the other plate when the first and second clamping plates are pivoted together. The wire which is arranged between the two clamping plates is thereby deformed into a meandering shape and forms a plurality of waves. In this way, the wire is fixed in the crimp connector in a direction parallel to the pivot axis of the bending portion. The distance between adjacent depressions in the clamping plate or the width of the ribs, is constant, or the depressions are arranged with a constant pitch. Although the structures surface of the clamping plates allows good fixing of wires having a certain diameter, wires having larger or smaller diameters can be less well fixed by the structured surface. The crimp connector would have to be specifically designed for each wire diameter. Consequently, the crimp connector is not universally usable with respect to different wire diameters.

SUMMARY

A crimp connector according to the disclosure may be suitable for fixing a plurality of wire diameters and may efficiently provide holding forces.

According to the disclosure, there is provision that the crimp connector comprises first and second clamping plates which are connected via a bending portion so as to be pivoted with respect to one another and which are suitable for clamping the wire between them in a clamping state in which they are pivoted against one another. The inner surfaces of the clamping plates that face one another in the clamping state are designed as clamping surfaces having a plurality of elongate depressions and elongate ribs, wherein the elongate depressions and the elongate ribs in each of the clamping surfaces run perpendicularly to the pivot axis of the bending portion, wherein the ribs of the one clamping plate are each arranged and dimensions in such a way that they are at least partially arranged in the depressions of the other clamping plate in the clamping state such that a wire clamped between the clamping plates in the clamping state is formed into a meandering shape and forms a number of waves. The distance between adjacent depressions in at least one of the first and second clamping plates varies along the respective clamping surface on a straight line parallel to the pivot axis.

The depressions are formed as roof-like recesses in the surface of the clamping surface. The width of a depression can therefore be understood to mean the distance between the edges of the depression at which the depression transitions into the surface of the inner surface surrounding them, in a direction along the pivot axis. The depth of a depression nis measured from the depression bottom to the edge of the depression in a direction normal to the clamping surface.

In the case of depressions having a rounded bottom, the depression bottom is as a rule the deepest point of the depression. The center, which is situated in a direction along the pivot axis, between the edges of the depression can also detonate the depression bottom, in particular in the case of depressions having a fastened bottom. The distance between two depressions is generally understood to mean the distance between the depression bottom of the one depression and the depression bottom of the other depression in a direction along the pivot axis.

In the case of ribs having a rounded profile, the distance between two ribs is the distance in a direction along the pivot axis between the highest points of the rib profiles. In the case of ribs having a flattened profile, the center, which situated in a direction along the pivot axis, for the flattened rib profile surface can be understood as a reference for determining the distance between two ribs.

Ribs in the clamping surfaces can be formed in such a way that adjacent depressions are arranged at a distance from one another and thus form a rib between them. In addition, a rib can also be formed by a depression and by a portion of the clamped surface that extends next to the depression and along the depression and has a profile height which is chosen in such a way that an elevation, that is to say a rib, is formed between the depression and the portion. Such a portion alas does not have to be formed in the manner of a groove, that can, for example, be a recess which is formed at a distance from the depression and which laterally adjoins the rib, but then flattens off.

The depressions formed in at least one of the first and second clamping plates each run parallel to one another, but are non-uniformly distributed in the direction transversely with respect to the parallel arrangement of the depressions. That is to say that the distance between adjacent depressions is not constant along the respective clamping surface on a straight line parallel to the pivot axis. To form the irregular profile, at least three depressions are required in at least one of the first and second clamping plates, with the other clamping plate then having at least three ribs. In principle, however, the number of depressions in the first and second clamping plates can be even greater.

The ribs and the corresponding depressions in which the ribs engage when the first and second clamping plates are pivoted together are tailored to one another in such a way that in the clamping state a meandering channel running along the pivot axis of the bending portion is formed between the first and second clamping plates and extends between two ends of the clamping plates.

The irregular arrangement of the depression sand the resulting distance between adjacent depressions that varies in the direction of the pivot axis results in a nonuniform wave-like wire profile when the first and second clamping plates are pivoted against one another and clamp a wire between them. The distance between adjacent depressions in the one clamping plate that varies on a straight line along the pivot axis is accompanied by a distance between adjacent ribs in the other clamp plates that varies along the pivot axis. There is a relationship between the wave profile and the diameter of the wire to the effect that the thicker the wire, the longer should be the wavelength of the resulting wave profile. In the case of wires having a large diameter, clamping surface profiles have large distance between the depressions, that is to say a wave profile having a large wavelength, proves to be more effective than clamping surface profiles having small distances between the depressions. In the case of thick wires, a wave profile having a large wavelength can be formed in more effectively than a wave profile having a short wavelength and thus provides more effective holding forces. On the other hand, thin wires are not effectively held by large distance between the wires and there is a risk of the wire becoming detached from the crimp connector. It has proved to be advantageous here to use a wave profile having a short wavelength. The present disclosure, with its nonuniform wave profile, allows wires having different diameters to be securely fastened to the crimp connector, since in any case the distances between depressions are well matched to the wire thickness in some regions of the clamping surfaces. The combination of different distances between the depressions and the resultant wave form makes it possible for very thick wires and thin wires to be effectively formed into a wave profile and securely held on the crimp connector. The crimp connector according to the disclosure is therefore variably usable with respect to different wire diameters, since an optimum holding region is present for each wire diameter.

According to the disclosure, a wire is to be understood as meaning either a single filament or a single thread or a bundle of filaments that is formed, for example, as a strand.

According to a further embodiment of the disclosure, the depressions of the first clamping plate comprise first outer depressions, for example two outer depressions, situated at the marginal regions of the first clamping plate and second inner depressions, for example two inner depressions, situated between the first outer depressions. A distance between adjacent inner second depressions is less than a distance between a first outer depression and an adjacent second inner depression.

According to a further embodiment of the disclosure, the distance between the adjacent depressions decreases starting from the marginal region of the first clamping plate in the direction of a center of the first clamping plate that is situated along the pivot axis.

According to a further embodiment of the disclosure, the first clamping plate comprises a pair of outer depressions, for example outer depression situated in the two outer marginal regions of the first clamping plate, and at least one pair of inner depressions between the outer depressions, wherein the distance between inner depressions is less than the distance between the outer depressions and the adjacent inner depressions.

A further embodiment of the disclosure provides that, starting from a center of the clamping plates, the depressions are symmetrically distributed in the direction of the marginal regions. This embodiment is distinguished in particular by a symmetrical rib/depression profile starting from the center and extending to the mutually opposite marginal regions, which in particular guarantees high holding forces in two directions.

A further embodiment of the disclosure provides that the bending portion has a reduced material thickness with respect to the adjacent clamping plates. A reduced thickness of the bending portion improves the bending behavior of the crimp connector to a considerable degree and provides effective protection from material damage.

According to a further embodiment of the disclosure, the outer margins, that is to say the first and second ends of the first and/or second clamping plate that are situated in a direction along the bending portion or the pivot axis, have an oblique edge. The edge can comprise an oblique surface, in particular a rounded oblique surface, in the manner of a bevel.

According to a further embodiment of the disclosure, the first and second clamping plates are formed in one piece, wherein the bending portion is likewise formed in one piece with the first and second clamping plates.

According to a particularly preferred embodiment of the disclosure, the depth of the depressions in the first clamping plate is from 0.045 to 0.055 mm, preferably 0.05 mm+/−0.02 mm.

According to a further embodiment of the disclosure, the distance between the outermost impressions, that is to say the depressions which lie at the first and second end of the respective clamping plate in a direction along the bending portion, is from 1.1 to 1.3 mm.

According to a further embodiment of the disclosure, the distance between adjacent inner depressions in the first clamping plate is from 0.24 mm to 0.36 mm.

BRIEF DESCRIPTION OF THE DRAWINGS

The disclosure will be explained in more detail below on the basis of a preferred exemplary embodiment. In the drawings.

DETAILED DESCRIPTION

Figure 1:
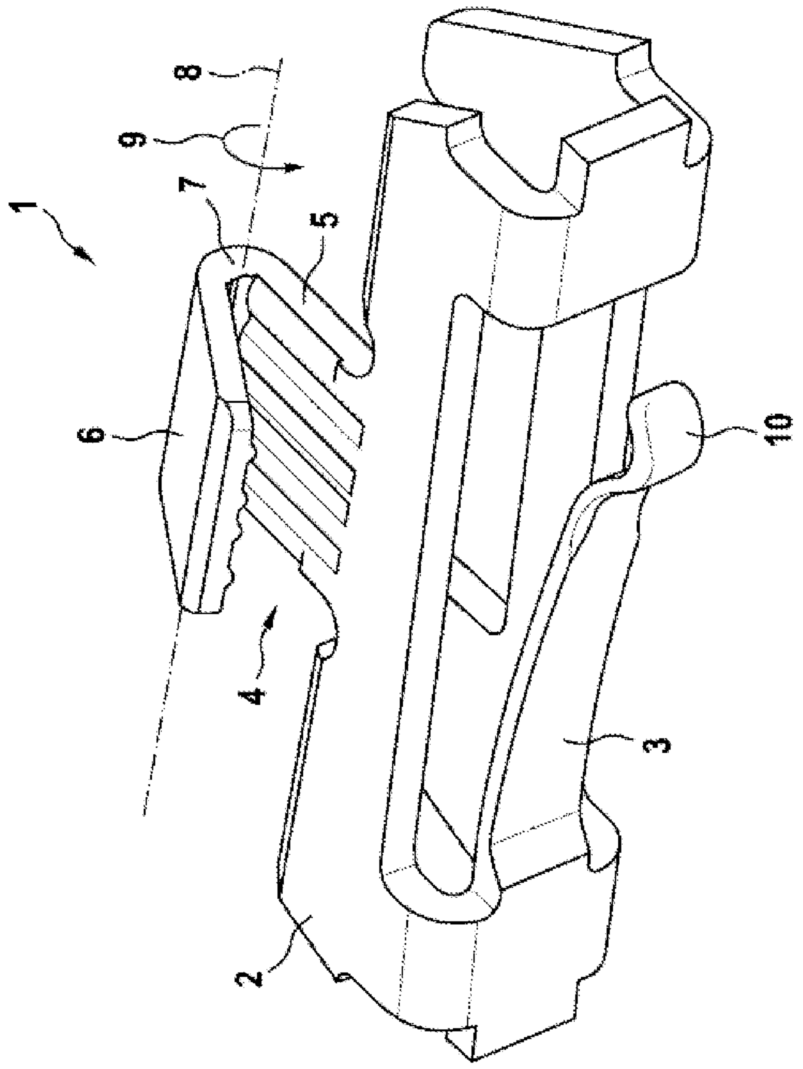
FIG. 1 shows a crimp connector according to a first embodiment of the disclosure in a perspective view.

FIG. 1 shows a crimp connector 1 having an elongate, U-shaped body 2 which at a lower end has a fastening portion 3 by means of which the crimp connector 1 can be fastened to a further body at its place of use. The fastening portion 3 here takes the form of a latching mechanism.

On the side of the crimp connector 1 that faces away from the fastening portion 3, the crimp connector 1 has a clamping portion 4 which has a first clamping plate 5 and a second clamping plate 6. The first clamping plate 5 is connected to the body 2. At the end of the first clamping plate 5 facing away from the body 2, the first clamping plate 5 is connected to the second clamping plate 6 via a bending portion 7 and thus forms a U-shaped configuration. The first clamping plate 5, the second clamping plate 6 and the bending portion 7, which connects the first clamping plate 5 and the second clamping plate 6, are formed in one piece. The second clamping plate 6 forms the free end of the clamping portion 4. The second clamping plate 6 is pivotable with respect to the first clamping plate 5, with the pivot axis 8 running through the bending portion 7. As a result, the second clamping plate 6 can be pivoted against the first clamping plate 5 about the pivot axis 8 of the bending portion 7, which is indicated by a curved arrow 9.

The fastening portion 3 has an elastic latching element 10 having a curved end portion for quickly fastening the crimp connector 1 at its place of use.

Figure 2:
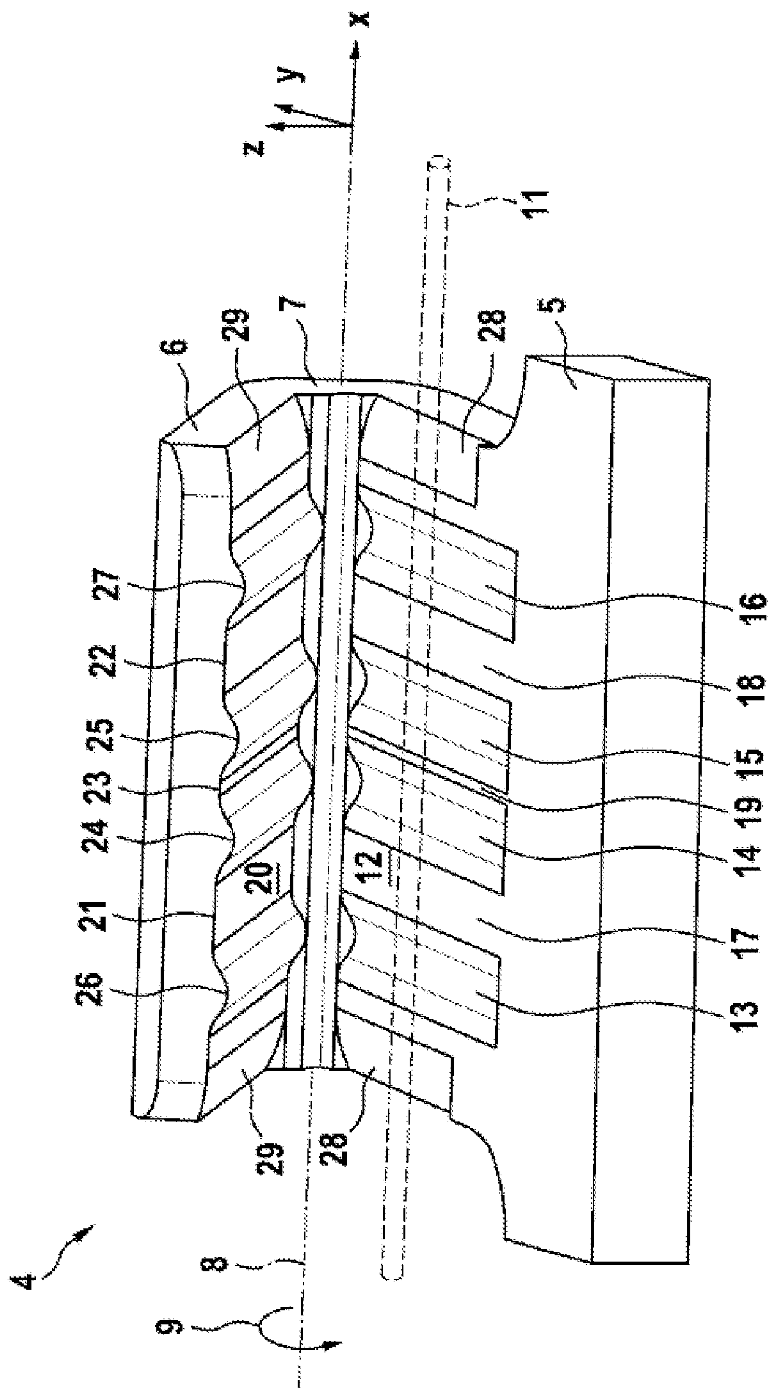
FIG. 2 shows details of the crimp connector from FIG. 1.

FIG. 2 shows the clamping portion 4 of the crimp connector 1 from FIG. 1. In addition, FIG. 2 shows a wire 11 made of a shape memory alloy (SMA) that is indicated by dashed lines. In order to clamp the wire between the first clamping plate 5 and the second clamping plate 6 and to fasten it to the crimp connector, the first clamping plate 5 and the second clamping plate 6 are pivoted against one another in the pivoting direction 9 and a clamping state is produced in which the wire 11 is clamped between the clamping plates 5 and 6.

To fix the wire 11, the first clamping plate 5 and the second clamping plate 6 have structured inner surfaces which face one another in the clamping state and which serve as clamping surfaces. The inner surface 12 of the first clamping plate 5 has a plurality of elongate depressions 13, 14, 15 and 16. The elongate depressions 13 to 16 each extend perpendicularly to the pivot axis 8, that is to say in the Y direction. The depressions of the first clamping plate 5 comprise two outer depressions 13 and 16 distributed along the pivot axis 8 (in the X direction) and two inner depressions 14 and 15 which are arranged between the outer depressions 13 and 16.

The depressions 13 to 16 of the first clamping plate 5 that are arranged next to one another are arranged at a distance from one another such that adjacent depressions form ribs between them. A first rib 17 is formed between the outer depression 13 and the adjacent inner depression 14. A second rib 18 is formed between the outer depression 16 and the adjacent inner depression 15. A third rib 19 is formed between the inner depressions 14 and 15.

The inner surface 20 of the second clamping plate 6 has a surface structure corresponding to the depressions and ribs of the inner surface 12 of the first clamping plate 5. The inner surface 20 comprises a first outer depression 21 and a second outer depression 22, and also an inner depression 23 situated between the outer depressions 21 and 22. The depressions 21 to 23 of the second clamping plate 6 are arranged in such a way that, in the clamping state, that is to say when the first and the second clamping plates 5 and 6 are pivoted against one another and the inner surfaces 12, 20 are situated opposite one another, the depression 21 of the second clamping plate 6 receives the rib 17 of the first clamping plate 5, the depression 23 of the second clamping plate 6 receives the rib 19 of the first clamping plate 5, and the depression 22 of the second clamping plate 6 receives the rib 18 of the first clamping plate 5.

The second clamping plate 6 forms a rib 24 between the depressions 21 and 23. The second clamping plate 6 forms a further rib 25 between the depressions 22 and 23. In addition, the second clamping plate 6 also forms outer ribs 26 and 27.

The ribs 24 to 27 of the second clamping plate 6 are arranged in such a way that they are arranged in the depressions 13 to 16 of the first clamping plate 5 in the clamping state. The ribs 17, 18 and 19 of the first clamping plate 5 are received in the depressions 21, 22 and 23 of the second clamping plate 6.

At the first and second ends of the clamping plates 5 and 6 in the X direction, the inner surfaces 12 and 20 of the first and second clamping plates 5 and 6 are provided with oblique edges 28 and 29. The oblique edges 29, 29 of the second clamping plate 6 are connected to the respective adjacent ribs 26, 27 via an elongate depression or via a portion which extends along the respective rib 26, 27 and which has a lower profile height with respect to the adjacent rib 26, 27 and flattens off in the direction of the respective edge 29, 29. That is to say that the outer ribs are each formed by the depressions 21, 22 and by the flattening-off portion which is formed between the outermost rib 26, 27 and the respective adjacent oblique edge 29, 29 and has a smaller profile height than the respective rib 26, 27.

To produce the clamping state, the wire 11 is placed on the inner surface 12 of the first clamping plate 5 or the inner surface 20 of the second clamping plate 6. The clamping state is then produced by pivoting the first clamping plate 5 and the second clamping plate 6 together, with the ribs of the inner surfaces engaging in the manner described above in the depressions of the respective other inner surface and forming, between the clamping plates folded onto one another, a meandering passage which extends in the X direction. The wire is deformed by the clamping plates being pivoted together and likewise assumes a meandering shape. In the side view, that is to say when looking at the X-Z plane, the wire forms a number of waves.

Figure 3:
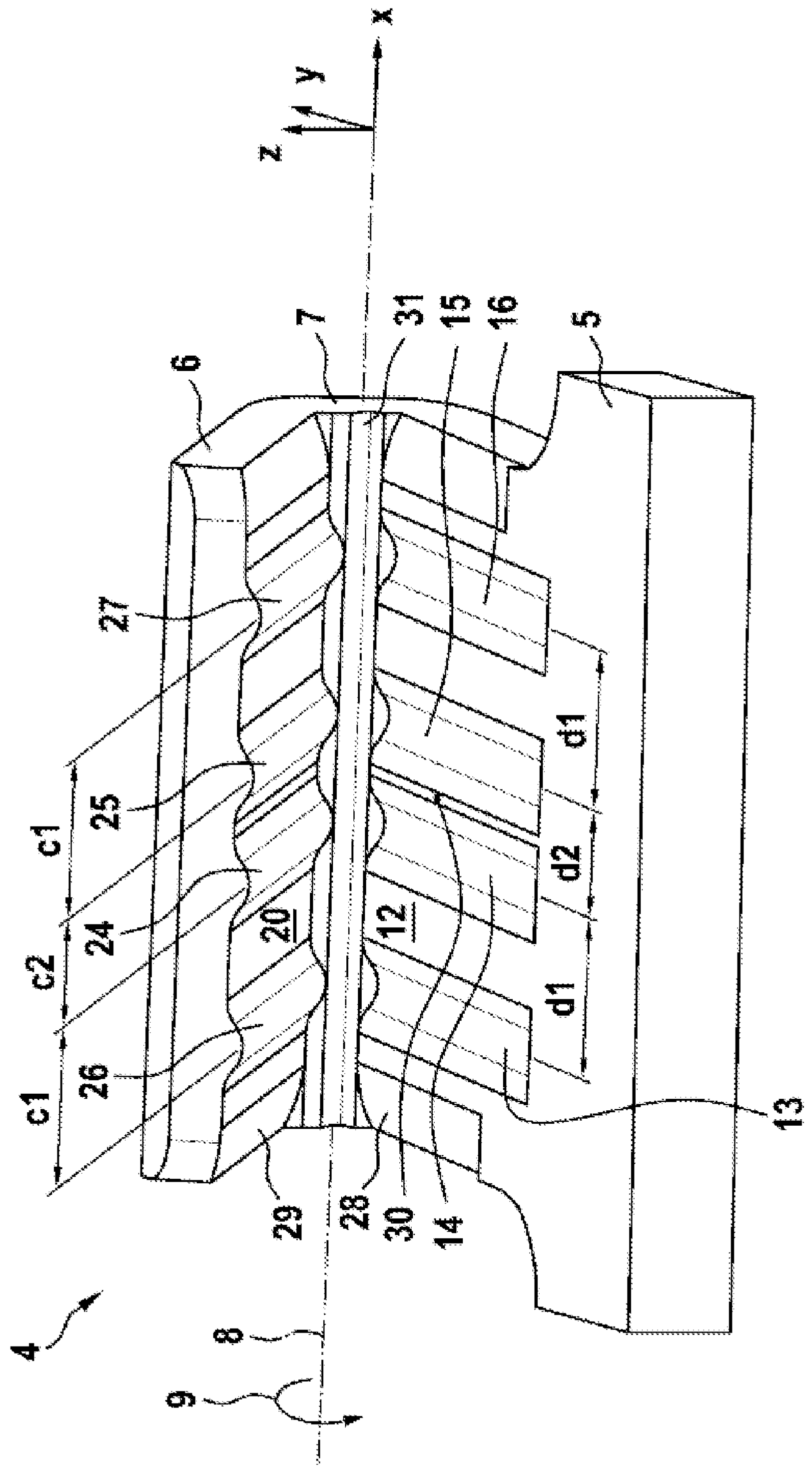
FIG. 3 shows details of the crimp connector from FIG. 1.

FIG. 3 once again shows the clamping portion 4 of the crimp connector from FIG. 2.

In the first clamping plate 5, the outer depression 13 and the adjacent inner depression 14 and also the other outer depression 16 and the inner depression 15 adjacent thereto are arranged at a distance d1 in the X direction. The two inner depressions 14 and 15 are arranged at a distance d2 in the X direction. The distance d2 is less than the distance d1. Thus, the distance between adjacent depressions in the first clamping plate 5 varies along the clamping surface 12 on a straight line parallel to the pivot axis 8.

Since the inner surface 20 of the second clamping plate 6 approximately constitutes a negative shape of the inner surface 12 of the first clamping plate 5 at least in certain portions, a corresponding nonuniform distribution of the depressions and ribs can be found here. The distance c1 between the rib 26 and the rib 24, and also the distance c1 between the rib 27 and rib 25, is greater than the distance c2 between the two inner ribs 24 and 25. This has the result that, in the second clamping plate 6, too, the distance between adjacent depressions varies along the clamping surface 20 on a straight line parallel to the pivot axis 8.

In the first clamping plate 5, the distance between adjacent depressions decreases starting from the marginal regions of the first clamping plate 5 that are situated in the X direction in the direction of a center 30 of the first clamping 5 that is situated in the X direction, which means that the distance between adjacent inner depressions is less than the distance between the outer depressions and the adjacent inner depressions.

Starting from the center 30 in the first clamping plate 5, the inner depressions 14 and 15 and also the outer depressions 13 and 16 are symmetrically distributed in the direction of the marginal regions of the first clamping plate 5.

The bending portion 7 is formed in one piece with the first clamping plate 5 and the second clamping plate 6. The bending portion 7 has a portion 31 of reduced interior thickness. This makes it easier for the second clamping plate 6 to be bent over onto the first clamping plate 5.

LIST OF REFERENCE SIGNS

1 Crimp connector
2 Body
3 Fastening portion
4 Clamping portion
5 First clamping plate
6 Second clamping plate
7 Bending portion
8 Pivot axis
9 Pivoting direction
10 Latching element
11 SMA wire
12 Inner surface of the first clamping plate
13 Outer depression of the first clamping plate
14 Inner depression of the first clamping plate
15 inner depression of the first clamping plate
16 Outer depression of the first clamping plate
17 Rib
18 Rib
19 Rib
20 Inner surface of the second clamping plate
21 Outer depression of the second clamping plate
22 Outer depression of the second clamping plate
23 Inner depression of the second clamping plate
24 Rib
25 Rib
26 Rib
27 Rib
28 Oblique edge
29 Oblique edge
30 Center
31 Portion of reduced material thickness

What is claimed is:

1. A crimp connector for a wire, comprising:

first and second clamping plates which are connected via a bending portion so as to be pivotable with respect to one another and which are suitable for clamping the wire between them in a clamping state in which they are pivoted against one another;

wherein inner surfaces of the clamping plates that face one another in the clamping state are designed as clamping surfaces having a plurality of elongated depressions and elongated ribs, wherein the depressions and the ribs in each of the clamping surfaces run perpendicularly to a pivot axis of the bending portion, wherein the ribs of one clamping plate are each arranged and dimensioned in such a way that they are at least partially arranged in the depressions of the other clamping plate in the clamping state such that a wire clamped between the clamping plates in the clamping state is formed into a meandering shape and forms a number of waves, and wherein distance between adjacent depressions in at least one of the first and second clamping plates varies along the clamping surface on a straight line parallel to the pivot axis.

2. The crimp connector according to claim 1, wherein the depressions of the first clamping plate comprise first outer depressions situated at marginal regions of the first clamping plate and second inner depressions situated between the first outer depressions, wherein a distance between adjacent second inner depressions is less than a distance between a first outer depression and an adjacent second inner depression.

3. The crimp connector according to claim 1, wherein the distance between the adjacent depressions decreases starting from a marginal region of the first clamping plate in a direction of a center of the first clamping plate.

4. The crimp connector according to claim 1, wherein the first clamping plate comprises a pair of outer depressions and at least one pair of inner depressions between the outer depressions, wherein a distance between adjacent inner depressions is less than a distance between the outer depressions and the adjacent inner depressions.

5. The crimp connector according to claim 1, wherein, starting from a center of at least one of the first clamping plate and the second clamping plate, the depressions are symmetrically distributed in a direction of mutually opposite marginal regions.

6. The crimp connector according to claim 1, wherein the bending portion has a reduced material thickness with respect to at least one of the first clamping plate and the second clamping plate.

7. The crimp connector according to claim 1, wherein outer margins of the first clamping plate and/or second clamping plate have an oblique edge.

8. The crimp connector according to claim 1, wherein the first and second clamping plates are formed in one piece.

9. The crimp connector according to claim 1, wherein a depth of the depressions in the first clamping plate is from 0.045 mm to 0.055 mm.

10. The crimp connector according to claim 1, wherein a depth of the depressions in the first clamping plate is 0.05 mm+/−0.02 mm.

11. The crimp connector according to claim 1, wherein a distance between outermost depressions in the first clamping plate is from 1.1 to 1.3 mm.

12. The crimp connector according to claim 1, wherein a distance between adjacent inner depressions in the first clamping plate is from 0.24 mm to 0.36 mm.

13. A connector comprising:

a clamping plate configured to clamp a wire between the clamping plate and a part of the connector, the clamping plate comprising:

a clamping surface having a plurality of elongated depressions and elongated ribs, wherein a distance between adjacent elongated depressions from amongst the plurality of elongated depressions on the clamping surface of the clamping plate varies along the clamping surface on a straight line parallel to a pivot axis of the connector.

14. The connector of claim 13, wherein the plurality of elongated depressions and elongated ribs arranged such that the wire clamped by the wire connector is formed into a meandering shape and forms a number of waves.

15. The connector of claim 13, wherein the plurality of elongated depressions of the clamping plate comprises: outer depressions situated at marginal regions of the clamping plate and inner depressions situated between the outer depressions of the clamping plate, wherein a first distance between inner depressions is less than a second distance between the outer depressions.

16. The connector of claim 13, wherein, starting from a centre of the clamping plate, the plurality of elongated depressions is symmetrically distributed in a direction of mutually opposite marginal regions of the clamping plate.

17. A connector comprising:

a first clamping plate comprising a plurality of first depressions and a plurality of first ribs;

a second clamping plate comprising a plurality of second depressions and a plurality of second ribs;

wherein the plurality of first ribs of the first clamping plate is arranged and dimensioned in such a way that they are at least partially arranged in the plurality of second depressions of the second clamping plate in a clamping state of the connector; and wherein a distance between adjacent elongated depressions, from amongst at least one of the plurality of first depressions and the plurality of second depressions of the first clamping plate and the second clamping plate respectively, varies along a clamping surface of a respective clamping plate, on a straight line parallel to a pivot axis of the connector.

18. The connector of claim 17 wherein, wherein the plurality of first ribs of the first clamping plate is arranged and dimensioned in such a way that they are at least partially arranged in the plurality of second depressions of the second clamping plate in the clamping state of the connector.

19. The connector of claim 17, wherein the plurality of first depressions and the plurality of first ribs of the first clamping plate and the plurality of second depressions and the plurality of second ribs of the second clamping plate are arranged in such a way that in a clamping state of the connector, a wire clamped between the first clamping plate and the second clamping plate is formed into a meandering shape and forms a number of waves.

20. The connector of claim 17 wherein, the first clamping plate and the second clamping plate is connected via a bending portion of the connector, so as to be pivotable with respect to one another.

* * * * *